Nov. 12, 1935.   H. DOURIF   2,020,539
PROCESS OF PRODUCING ULTRAMARINE BLUE AND A NEW ARTICLE OF MANUFACTURE
Filed May 7, 1931
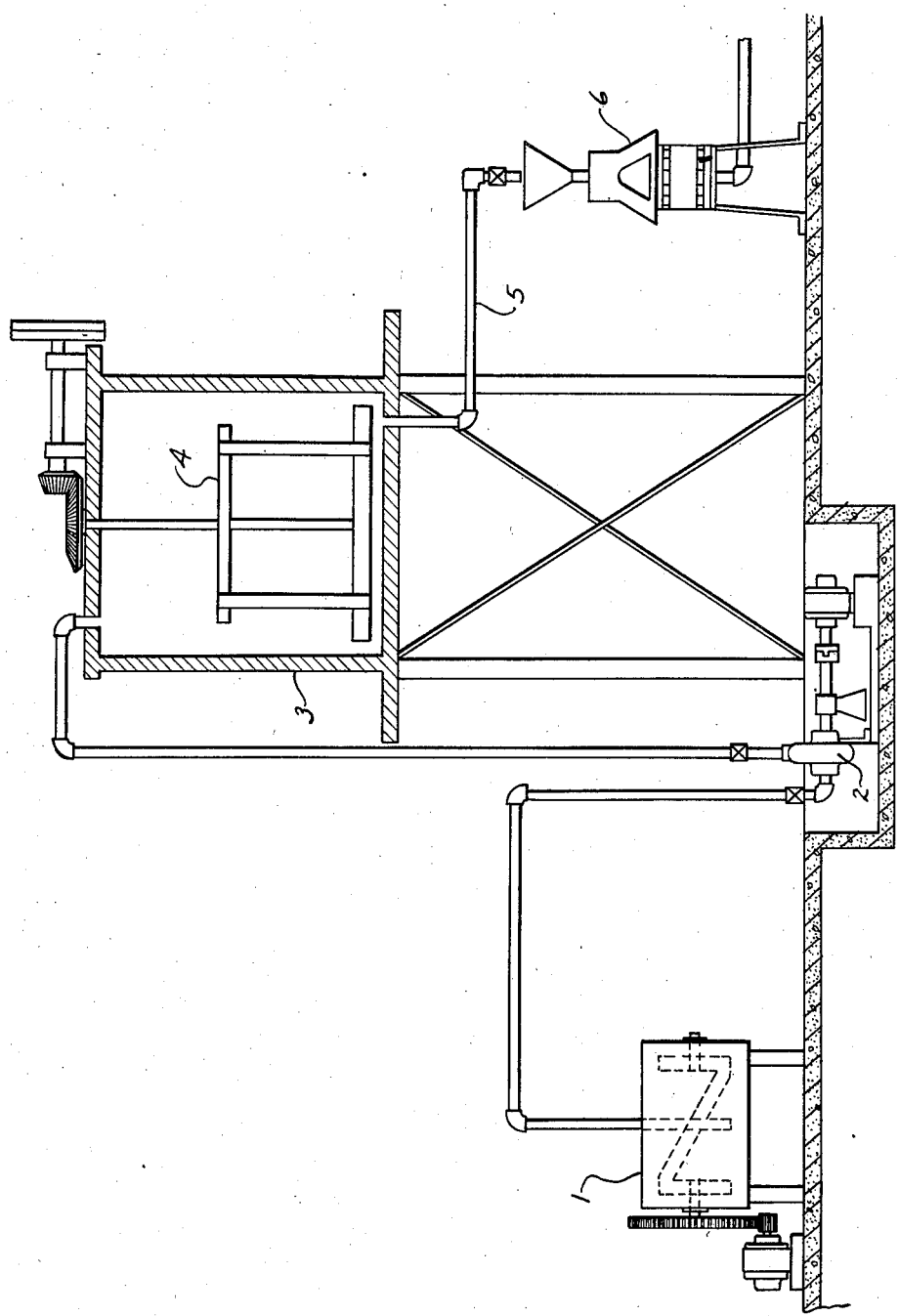

Patented Nov. 12, 1935

2,020,539

UNITED STATES PATENT OFFICE 2,020,539

PROCESS OF PRODUCING ULTRAMARINE BLUE AND A NEW ARTICLE OF MANUFACTURE

Henry Dourif, Huntington, W. Va., assignor to The Standard Ultramarine Company, Huntington, W. Va., a corporation Application May 7, 1931, Serial No. 535,720

1 Claim. (Cl. 8—6)

My invention relates to a new article of manufacture for use as ultramarine blue.

Commercial ultramarine blue is an insoluble pigment of the approximate formula $Si_6Al_4Na_6S_4O_{20}$, specific gravity 2.1 to 2.5.

It is the object of my invention to provide a composite product containing ultramarine blue in large percentage in liquid or gel form which would revert to the liquid form under certain conditions in order to give uniform treatment in the bleaching of textiles, general laundering and in other processes where ultramarine blue is to be dispersed eventually in a medium consisting chiefly of water. Heretofore, where it has been desired to have instantaneous and complete dispersion of the insoluble pigment in water of the bleaching or bluing agent, it has always been necessary to have strong mechanical agitation to effect this dispersion; and, as soon as the mechanical agitation has ceased, some insoluble pigment would precipitate with the result that agglomerated particles of ultra-marine blue always remain present causing objectionable blue spots or streaks in the fabric or other material being treated.

Furthermore, when it is so being treated, it is difficult to give the combined article being treated and the liquid suspension of ultramarine blue sufficient agitation to insure thorough dispersion.

I have further found that particles of ultramarine blue, when in suspension in water or in other vehicles, even of high viscosity, have a strong attraction for one another and after they separate from the vehicle due to their density form a hard sediment that is very difficult of further dispersion.

It is my object to obviate this difficulty by the following process which results in a product which contains ultramarine in large proportion in the form of a gel, which is capable of reverting to a liquid capable of being poured out of a vessel having the characteristics of being non-settling regardless of the place or time of standing, and capable of very rapid and complete dispersion in water without the need of strong mechanical agitation.

It is my further object to provide such a composite gel containing a high ratio of ultramarine blue, which blue is incorporated as a dry or wet powder or water pulp.

It is a further object to provide such a product in gel form in which the suspending medium has greater dispersive qualities than the attraction qualities of the ultramarine blue pigment compound.

It is a further object to provide a product in the form of a semi-rigid gel (said gel quivers when shaken), which will remain with the ultramarine blue in suspension and dispersion uniformly in a homogeneous condition for an indefinite period and having the capability of becoming liquid under a slight agitation and return to the gel phase on being allowed to stand unagitated for a period, but no matter whether it is in the solid gel phase or in the liquid phase, the homogeneous suspension of the ultramarine blue continues and is uniform.

It is a further object to provide a product which has the capacity, when a small quantity is placed in a large amount of water, of the individual particles of ultramarine dispersing radially in water as if repelling each other.

The accompanying drawing illustrates a form of mechanical mixing apparatus which I have successfully employed.

In the practice of my process of manufacturing ultramarine blue, the crude ultramarine is produced in kilns in the usual manner and is then successively washed free of salts, ground in mills in the presence of water, and then submitted to increasing periods of settling unagitated in tanks.

During the first settling operation, usually of two hours' duration, the coarser particles separate from the liquid and settle at the bottom of the tank in a solid cake.

The supernatant liquid is then moved over to a second tank and the solid settling is sent to be dried. In the second tank a longer time of settling is allowed, usually one day, and, at the end of that time, a finer size of particle has settled in a solid cake at the bottom, and the supernatant liquid is transferred to a third tank for a settling period of about four days. Another solid cake of still finer particles is so produced and the liquid is transferred to a fourth tank for a time of settling of about fifteen days. This last settling produces a solid cake of the finest sized particles usually obtained by settling.

All of the solid cakes are sent to a drier. They disintegrate readily after they are dried forming "ultramarine powder."

The solid cake before drying is referred to herein as "wet powder".

Centrifugal force may be resorted to instead of gravity to extract the ultramarine blue from its liquid. But, whether the final supernatant liquid comes from a settling tank or centrifugal machine, it still contains a large proportion of exceedingly fine particles of almost colloidal size which are generally recovered by chemical precipitation, using calcium chloride, calcium sulphate, alum or weak acids as precipitating agents.

After the precipitating agent is added to the blue liquid, a layer of blue particles suspended in water of about twelve percent blue and eighty eight percent water takes form in the bottom of the container, covered by an entirely clear layer of supernatant water containing various soluble impurities, such as calcium chloride, sodium sulphate, etc.

This layer of blue suspended in water containing soluble impurities may be recovered by the use of a filter or centrifugal machine which separates the water pulp containing about fifty percent ultramarine and fifty percent water from the bulk of the water containing soluble impurities. This is the "water pulp" form of ultramarine referred to herein.

In one phase of the practice of my process, I have been able to accomplish a fair result, although not the preferred one, by employing the water pulp heretofore referred to and accomplishing the result as follows.

I find that water alone can suspend this water pulp ultramarine in a non-settling gel form capable of reverting to a liquid phase, capable of fair dispersion in water provided the cohesive forces present in the pulp phase be nullified by homogenization of the pulp in a small quantity of added water by means of strong mechanical mixing or the use of colloidal mills.

This method of accomplishing a fair result and practicing my process is comprehended within my invention.

To obtain a result possessing all the desirable characteristics to a greater degree than secured by a method of simple mechanical treatment in water alone, I prefer to employ certain organic substances as assistants during the homogenization of the several varieties of ultramarine blue. As augmenters I use such chemical substances as Turkey red oil, cactus extracts or components thereof, mono di and triethanolamine, or a mixture of these ethanolamines, or organic substances capable of acting as dispersing and deterging agents, being able to break down the normal cohesive characteristics of the various ultramarine blues described previously. These substances are chemically neutral or slightly basic. They assist in producing a composite product in liquid or gel form possessing the valuable characteristics of non-settling, easy dispersion in water.

In accomplishing this process and in practicing my process to secure the product described, I first wet the dry ultramarine blue powder or mix with the wet powder any one of the foregoing organic substances, provided such substance is chemically neutral or slightly basic and soluble in water. Or, again, I mix with the commercial water pulp ultramarine any one of the foregoing organic substances or its equivalent, which is chemically neutral or slightly basic and soluble in water.

As a typical method of accomplishing these results, I mix at approximately room temperature one part by weight of dry ultramarine powder with one part by weight of Turkey red oil (60%) and one part by weight of water.

A typical proportion of ingredients to produce ultramarine gels when using wet ultramarine powder consisting of about 50% ultramarine and 50% water is to mix 150 parts of the wet ultramarine powder, 16 parts of Turkey red oil (60%) and 16 parts of water, all by weight.

When using water pulp ultramarine comprising 50% ultramarine and 50% water, I take 150 parts of the dry pulp ultramarine charging them into a mixer and add 11 parts of Turkey red oil (60%) very gradually in small aliquots. The assimilation of the oil requires a little more time and care in the mixer than is necessary with the previously described combinations. The mixer is designated in the accompanying drawing as 1. The mixture having reached a liquid phase is pumped by the pump 2 to a storage tank 3 where it is agitated by the agitator 4 and thence delivered to a pipe 5 to a colloidal mill 6 for more complete homogenization.

It will be understood that I mention only a few of the possible organic substances which will have this capacity of acting as a dispersive agent to break down the normal cohesive characteristics of ultramarine blue when in water suspension or dispersion. Such substances are chemically neutral or slightly basic. They result in producing a composite product in gel form capable, upon slight agitation, to revert to liquid form and in any event having the ultramarine blue in perfectly uniform homogeneous dispersion throughout the suspending medium to accomplish the objects heretofore set forth in this application.

It will be understood that I desire to comprehend within my process varying types of materials and temperatures and I comprehend within my claim the necessary modifications of the steps of my process to fit varying conditions of use, and I comprehend within the claim as to my product such variations as may be necessary in the practice of the process and the production of the product and in the use of the product itself to fit varying commercial conditions while still retaining the essence of my invention.

Having thus fully described my invention, what I claim as new and desire to secure by Letters Patent, is:

An ultramarine gel for laundry purposes capable of reverting to liquid form upon agitation comprising a mixture of finely divided ultramarine blue particles with an organic substance selected from a group consisting of monoethanolamine, diethanolamine and triethanolamine in water, whereby to provide a gel the particles of which are non-settling and which is capable of easy dispersion in water or any medium consisting primarily of water.

HENRY DOURIF.